United States Patent
Benavides et al.

(10) Patent No.: US 12,266,937 B2
(45) Date of Patent: Apr. 1, 2025

(54) HIGH SPEED PROTECTION FOR PHASE BALANCER WITH ZIG-ZAG TRANSFORMER

(71) Applicant: SWITCHED SOURCE PB, LLC, Vestal, NY (US)

(72) Inventors: Nicholas D. Benavides, Zionsville, IN (US); Charles J. Murray, Chicago, IL (US)

(73) Assignee: Switched Source PB, LLC, Vestal, NY (US)

( * ) Notice: Subject to any disclaimer, the term of this patent is extended or adjusted under 35 U.S.C. 154(b) by 26 days.

(21) Appl. No.: 18/052,006

(22) Filed: Nov. 2, 2022

(65) Prior Publication Data
US 2024/0154419 A1    May 9, 2024

(51) Int. Cl.
*H02J 3/26* (2006.01)
*H02J 3/18* (2006.01)
*H02M 7/48* (2007.01)

(52) U.S. Cl.
CPC ........ *H02J 3/26* (2013.01); *H02J 3/18* (2013.01); *H02M 7/48* (2013.01)

(58) Field of Classification Search
None
See application file for complete search history.

(56) References Cited

U.S. PATENT DOCUMENTS

| | | | | |
|---|---|---|---|---|
| 5,568,371 A | * | 10/1996 | Pitel | H02J 3/01 363/39 |
| 5,574,356 A | * | 11/1996 | Parker | H02J 3/1835 363/40 |
| 5,790,356 A | * | 8/1998 | Bottrell | H02H 7/04 361/93.6 |
| 5,831,842 A | * | 11/1998 | Ogasawara | H02M 1/12 363/40 |
| 5,984,173 A | | 11/1999 | Edwards | |

(Continued)

OTHER PUBLICATIONS

Sreenivasarao D et al: "Performance enhancement of a reduced rating hybrid D-STATCOM for three-phase, four-wire system", Electric Power Systems Research, Elsevier, Amsterdam, NL, vol. 97, Feb. 1, 2013 (Feb. 1, 2013), pp. 158-171, XP028971925, ISSN: 0378-7796, DOI: 10.1016/J.EPSR.2012.12.018 p. 159; figure 1.

(Continued)

*Primary Examiner* — Yusef A Ahmed
(74) *Attorney, Agent, or Firm* — Philip E. Levy; Eckert Seamans Cherin & Mellott, LLC

(57) ABSTRACT

A zero-sequence current balancer for a controlling zero-sequence current in a three-phase power system includes a zig-zag transformer coupled to the three-phase power system, an inverter coupled to an output of the zig-zag transformer, and at least one of: (i) a clamp device operating as a normally open switch, the clamp device being provided in between the output of the zig-zag transformer and a neutral conductor (which may be grounded) and being connected in parallel with the inverter, and (ii) a load-break switch provided between the output end of the zig-zag transformer and an input of inverter. A controller is structured and configured to detect a fault condition in the three-phase power system, and in response cause at least one of the closing of the clamp device or the opening of the load-break switch in order to protect the system.

10 Claims, 4 Drawing Sheets

(56) References Cited

U.S. PATENT DOCUMENTS

| | | | | |
|---|---|---|---|---|
| 6,188,552 B1* | 2/2001 | Jaeschke | H02H 9/08 | 361/48 |
| 7,170,268 B2* | 1/2007 | Kim | H02M 3/1584 | 323/272 |
| 8,274,803 B2* | 9/2012 | Swamy | H02M 5/458 | 318/140 |
| 8,362,733 B2* | 1/2013 | Inuduka | H02P 25/24 | 318/494 |
| 9,285,817 B2 | 3/2016 | Wong | | |
| 9,294,003 B2 | 3/2016 | Peng | | |
| 10,700,616 B2* | 6/2020 | Ogasawara | H02M 7/48 | |
| 11,005,265 B1* | 5/2021 | Benavides | H02J 3/1878 | |
| 11,056,883 B1 | 7/2021 | Benavides et al. | | |
| 11,159,091 B2* | 10/2021 | Divan | H02J 3/26 | |
| 11,218,069 B2* | 1/2022 | Yamamoto | H02M 7/5395 | |
| 11,296,509 B1* | 4/2022 | Benavides | H02J 3/26 | |
| 11,515,780 B2* | 11/2022 | Karinca | H02M 1/12 | |
| 2001/0045863 A1* | 11/2001 | Pelly | H02M 5/458 | 327/552 |
| 2003/0197989 A1* | 10/2003 | Nojima | H02P 29/02 | 361/47 |
| 2005/0253564 A1* | 11/2005 | Choi | H02J 3/1842 | 323/207 |
| 2009/0315404 A1* | 12/2009 | Cramer | H02J 3/381 | 307/82 |
| 2011/0199707 A1* | 8/2011 | Kazemi | H02H 7/20 | 361/47 |
| 2012/0039101 A1* | 2/2012 | Falk | H02J 3/42 | 363/95 |
| 2012/0068655 A1* | 3/2012 | Inuduka | H02P 25/24 | 318/494 |
| 2012/0306439 A1* | 12/2012 | Ichikawa | B60L 53/22 | 320/108 |
| 2013/0121029 A1* | 5/2013 | Coors | H02J 3/08 | 363/13 |
| 2013/0176751 A1* | 7/2013 | Olea | H02J 3/241 | 363/16 |
| 2013/0208514 A1* | 8/2013 | Trainer | H02M 1/4208 | 363/35 |
| 2014/0210271 A1* | 7/2014 | Toyoda | H02J 9/061 | 307/66 |
| 2014/0362618 A1* | 12/2014 | Hassan | H02J 3/18 | 363/35 |
| 2016/0254668 A1* | 9/2016 | Huang | H02M 7/06 | 307/64 |
| 2016/0365727 A1* | 12/2016 | Kam | H02H 7/28 | |
| 2017/0353036 A1* | 12/2017 | Gil Lizarbe | H02J 3/381 | |
| 2021/0226449 A1* | 7/2021 | Dong | H02J 3/1814 | |
| 2021/0408889 A1* | 12/2021 | Zhu | H02J 7/02 | |
| 2022/0140781 A1* | 5/2022 | Zhang | H02J 3/381 | 136/243 |
| 2022/0285973 A1* | 9/2022 | Zhang | H02M 1/36 | |
| 2023/0155413 A1* | 5/2023 | Allert | H02M 7/797 | 307/66 |
| 2023/0366953 A1* | 11/2023 | Xu | G01R 31/55 | |
| 2024/0106351 A1* | 3/2024 | Yu | H02M 7/537 | |
| 2024/0213767 A1* | 6/2024 | Lu | H02H 7/20 | |

OTHER PUBLICATIONS

Jou et. al. "Analysis of Zig-Zag Transformer Applying in the Three-Phase Four-Wire Distribution Power System" IEEE Transactions on Power Delivery, vol. 20, No. 2, Apr. 2005.

Jou et. al. "A Three-Phase Four-Wire Power Filter Comprising a Three-Phase Three-Wire Active Power Filter and a Zig-Zag Transformer" IEEE Transactions on Power Electronics, vol. 23, No. 1, Jan. 2008.

Singh, et. al. "Reduced Rating VSC With a Zig-Zag Transformer for Current Compensation in a Three-Phase Four-Wire Distribution System" IEEE Transactions on Power Delivery vol. 24, No. 1, Jan. 2009.

Choi, S. and Jang, M. "Analysis and Control of a Single-Phase-Inverter-Zigzag-Transformer Hybrid Neutral-Current Suppressor in Three-Phase Four-Wire Systems" IEEE Transactions on Industrial Electronics, vol. 54, No. 4, Aug. 2007.

Nagarjuna, et al. "Reduced Rating VSC with a Zig-Zag Transformer for Current Compensation in a Three-Phase Four-Wire Distribution System" International Journal of Modern Engineering Research, vol. 2, Issue.4, Jul.-Aug. 2012 pp. 2957-2963.

* cited by examiner

HIGH SPEED PROTECTION FOR PHASE BALANCER WITH ZIG-ZAG TRANSFORMER

FIELD OF THE INVENTION

The disclosed concept relates generally to three-phase power systems and, more specifically, to a phase balancing system for minimizing neutral current in the utility power grid, also known as "zero-sequence current", that includes a number of components for protecting the phase balancing system during grid-fault conditions, thereby allowing a reduction in component ratings and therefore overall system cost. In the exemplary embodiments, there are two components that are disclosed for providing this protection, either alone or in combination with one another. The first component that is disclosed is an electrical clamp circuit that bypasses the inverter during grid-fault conditions. The second component that is disclosed is an electrical load-break switch that can react more quickly than the existing mechanical main circuit contactor.

BACKGROUND OF THE INVENTION

An electrical power system normally operates in a balanced three-phase sinusoidal steady-state mode. However, there are certain situations that can cause imbalanced operations. The most severe of these would be a fault or short circuit. Examples may include a tree in contact with a conductor, a lightning strike, or downed power line. The basic theory of symmetrical components is that phase currents and voltages in a three-phase power system can be represented by three single-phase components. These are positive-, negative- and zero-sequence components. The positive sequence component of current or voltage has the same rotation as the power system. This component represents a balanced load.

If the generator phase currents are equal and displaced by exactly 120°, only positive-sequence current will exist. A current or voltage imbalance between phases in magnitude or phase angle gives rise to negative- and zero-sequence components. The negative sequence component has a rotation opposite that of the power system. The zero-sequence component represents an imbalance that causes current flow in the neutral.

High levels of positive-, negative- and zero-sequence harmonic currents are generated by the single-phase, non-linear loads that are connected between phase and neutral in a three-phase, four-wire distribution system. Although each single-phase, non-linear load is normally small, they often represent 95% to 100% of all loads connected to a low voltage distribution system in an office, data center or audio-video facility, for example. Perhaps more importantly, a driver of these imbalances is increased penetration of single-phase (e.g., residential) renewable power generation installations, which are "large" and somewhat unpredictable from a long-term planning standpoint.

Unlike the positive- and negative-sequence phase currents, which are each displaced by 120° in a three-phase system, zero-sequence currents are each displaced by 0° and are therefore "in-phase". As a result, zero-sequence currents combine arithmetically at the source transformer's neutral terminal and return to the nonlinear loads via the system's neutral conductor. In a worst-case scenario, the resulting zero-sequence neutral currents may be greater than 1.5 times the phase currents.

Zero-sequence currents, acting in an Ohm's Law relationship with the system's zero-sequence impedances, produce zero-sequence voltages. These zero-sequence voltages distort the fundamental voltage waveforms. Systems and methods for alleviating fundamental frequency line load imbalance in the distribution system will thus reduce line loss and increase power system capacity without installing new lines. Systems and methods for reducing zero-sequence current in a three-phase power system are therefore desirable.

U.S. Pat. Nos. 11,056,883 and 11,296,509, each assigned to the assignee hereof, describe various embodiments of phase balancing systems that utilizes a "zig-zag" grounding transformer for minimizing zero-sequence currents. The base phase balancing technology disclosed in these patents is shown in FIG. 1. As shown, the base phase balancing technology includes a zero-sequence current balancer 5 that is coupled to the phase lines a, b, and c and the neutral conductor n (shown as equivalent to the ground connection in this case for ease of illustration) of a three-phase, four wire power system. Zero-sequence current balancer 5 in the illustrated embodiment includes a four terminal zig-zag transformer 10, a main contactor 15 inserted between zig-zag transformer 10 and phase a, phase b, and phase c of the three-phase, four wire power system, an inverter 30 coupled to the output end of zig-zag transformer 10, a real power injector 40 coupled to inverter 30 and phase a, phase b, and phase c of the three-phase, four wire power system, and a controller 50 structured and configured for controlling operation of the components of zero-sequence current balancer 5. Real power injector 40 that is included in the illustrated exemplary embodiment is structured and configured for injecting real power into and/or absorbing real power from the system (in a unidirectional or bidirectional manner) over a wide angle of load conditions to replenish any internal power loss and/or regulate the capacitor voltages of the system. More specifically, in the exemplary embodiment, real power injector 40 provides real power into inverter 30 from side ports thereof into the DC link thereof. Various configurations for implementing real power injector 40 are described in U.S. Pat. No. 11,296,509, which is incorporated herein by reference. It will be understood, however, that the injection of real power as just described in not required in connection with the disclosed concept. In fact, the disclosed concept may be applied to any of the circuit configurations described in U.S. Pat. No. 11,056,883, including those that do not employ real power injection. Additionally, if the real power injection system were replaced with a traditional rectifier (ac/dc converter), then this would be representative of an embodiment of the technology from U.S. Pat. No. 5,568,371, and the disclosed concept may be applied to such a system as well. Furthermore, as described in U.S. Pat. Nos. 11,056,883 and 11,296,509, zero-sequence current balancer 5 may, in some embodiments, include a number of Cascade Multilevel Modular Inverters (CMMIs) that enable the zero-sequence impedance to be actively controlled, allowing injection of zero-sequence current that is less dependent on the network conditions. However, like the use of real power injection, use of a CMMI(s) is optional and is not required in connection with the implementation of the disclosed concept as described herein.

A key constraint of these existing technologies is tolerance to grid-fault conditions, which leads to severely imbalanced voltages in the power grid. In these cases, the system controller 50 will act to disconnect the phase balancer system from the power grid. Main contactor 15, however, is most often realized with mechanical contactors such as vacuum or gas-filled circuit breakers, which can take multiple cycles of the ac power before the physical contacts have opened and the arc is effectively broken. In the meantime, the semiconductors forming a part of inverter 30 must withstand the high voltage present or, if they are used to clamp the voltage, they must sustain a high current that can flow into the fault limited only by the impedance of zig-zag transformer 10. The most challenging fault condition for zero-sequence current balancer 5 is the case of a single-phase fault between any phase and neutral (or Earth in typical grounded system), which leads to a significant zero-sequence voltage at the terminals. This constraint drives significant cost in inverter 30 and real power injector 40. In the previously developed solutions described above, the design was optimized to split this voltage approximately evenly between zig-zag transformer 10 and inverter 30, for example using CMMI technology as described. This split, combined with the designed—in impedance in zig-zag transformer 10, prevents the semiconductors in inverter 30 from exceeding their current ratings. In one specific as-built design, this led to an approximately 4× increase in the voltage rating of inverter 30, which carries an important cost impact.

A simple solution to this problem would be to replace main contactor 15 with semiconductor devices. This, however, will cause extra power loss during normal operation, requiring extra cooling. Also, in such a configuration, the phase balancer cannot contribute current to the fault, which is preferred by the power utility in many applications to help the protection systems isolate the system fault.

SUMMARY OF THE INVENTION

In one embodiment, a zero-sequence current balancer for a controlling zero-sequence current in a three-phase power system is provided. The zero-sequence current balancer includes a zig-zag transformer coupled to the three-phase power system, an inverter coupled to an output of the zig-zag transformer, and at least one of: (i) a clamp device operating as a normally open switch, the clamp device being provided in between the output of the zig-zag transformer and a neutral conductor (which may in some implementations be connected to ground, although this is not required), and being connected in parallel with the inverter, and (ii) a load-break switch provided between the output end of the zig-zag transformer and an input of inverter. A controller is also provided that, responsive to detecting a fault condition in the three-phase power system, causes at least one of closing of the clamp device or opening of the load-break switch in order to protect the system.

In another embodiment, a method for a controlling zero-sequence current in a three-phase power system is provided. The method includes providing: (i) a zig-zag transformer coupled to the three-phase power system, (ii) an inverter coupled to an output of the zig-zag transformer, and (iii) at least one of: (a) a clamp device operating as a normally open switch, the clamp device being provided in between the output of the zig-zag transformer and a neutral conductor (which may is some implementations be connected to, although this is not required), and being connected in parallel with the inverter, and (b) a load-break switch provided between the output end of the zig-zag transformer and an input of inverter. The method further comprises detecting a fault condition in the three-phase power system, and responsive to detecting the fault condition, causing at least one of closing of the clamp device or opening of the load-break switch.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
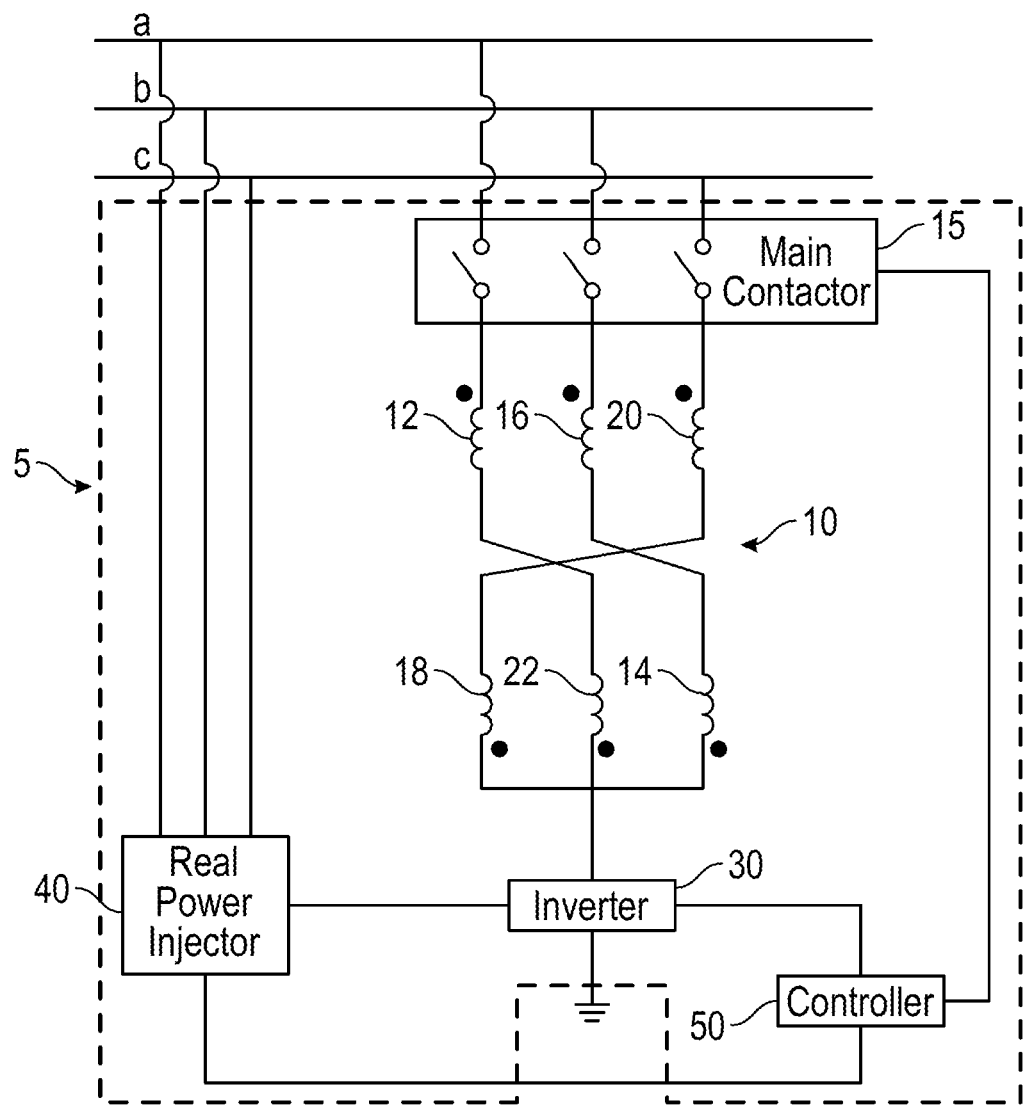
FIG. 1 is a schematic diagram of a prior art phase balancing system that utilizes a zig-zag grounding transformer for minimizing zero-sequence currents.
Figure 2:
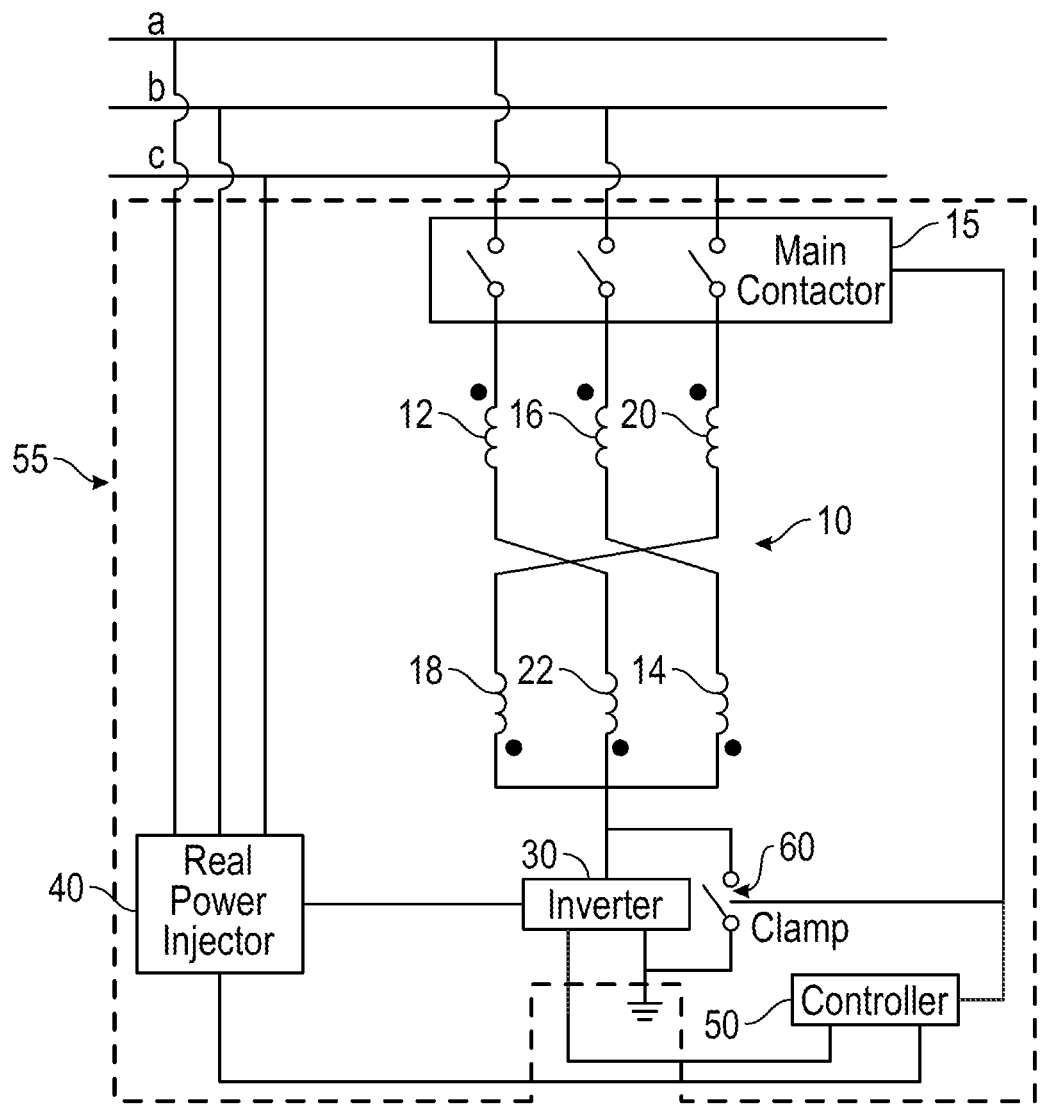
FIG. 2 is a schematic diagram of a zero-sequence current balancer according to a first embodiment of the disclosed concept.

FIG. 2 is a schematic diagram of a zero-sequence current balancer 55 according to a first embodiment of the disclosed concept that is coupled to the phase lines a, b, and c and the neutral conductor (shown as equivalent to the ground connection in this case for ease of illustration) of a three-phase, four wire power system. Zero-sequence current balancer 55 is similar to zero-sequence current balancer 5, and like parts are labelled with like refence numerals. However, in this first embodiment, as described in greater detail below, zero-sequence current balancer 55 differs from zero-sequence current balancer 5 in that it further includes a high-speed clamp device to bypass inverter 30. More specifically, as shown in FIG. 2, zero-sequence current balancer 55 includes a four terminal zig-zag transformer 10, a main contactor 15 inserted between zig-zag transformer 10 and phase a, phase b, and phase c of the three-phase, four wire power system, an inverter 30 coupled to the output end of zig-zag transformer 10, a real power injector 40 coupled to inverter 30 and phase a, phase b, and phase c of the three-phase, four wire power system, a clamping device 60 that is provided in parallel with inverter 30 between the output end of zig-zag transformer 10 and the neutral conductor (shown as equivalent to the ground connection in this case for ease of illustration) to enable selective bypass of inverter 30, and a controller 50 structured and configured for controlling operation of the components of zero-sequence current balancer 55.

Clamp device 60 functions as a normally-open switch, which is closed when the current and/or voltage reaches a certain predetermined level (the voltage leads the current in time due to the inductive nature of the transformer, and may generally be achieved with semiconductor device(s) to achieve the speed required to bypass inverter 30 before the current can rise within inverter 30 to a level that would damage the semiconductors in inverter 30. The rate-of-rise of the current in inverter 30 is limited by the impedance of zig-zag transformer 10. As a result, there is a small window of time, e.g., <2 ms in the exemplary embodiment (or in the range of 1-2000 μs in one non-limiting particular implementation), during which this bypass can be achieved. In particular, the fault can be readily detected by the controller 50, which generally has high-bandwidth measurements of the terminal voltage and current needed for the control of inverter 30. The most likely embodiment of clamp device 60 would be an antiparallel thyristor in a triac-like arrangement. This would allow the clamp to block voltage in either direction when untriggered and carry current in either direction when triggered. Thyristor devices, specifically the subtype referred to as Silicon Controlled Rectifiers (SCRs), are commercially available with very high voltage and peak current ratings, and a much lower cost when compared to the semiconductors used in inverter 30. Alternate embodiments of clamp device 60 may be based on metal-oxide-semiconductor technology, such as MOSFETs, IGBTs, and HEMT-FETs; or a very high-speed mechanical contactor such as those made from Micro Electro-Mechanical Switches (MEMS) or those utilizing explosive charges.

Figure 3:
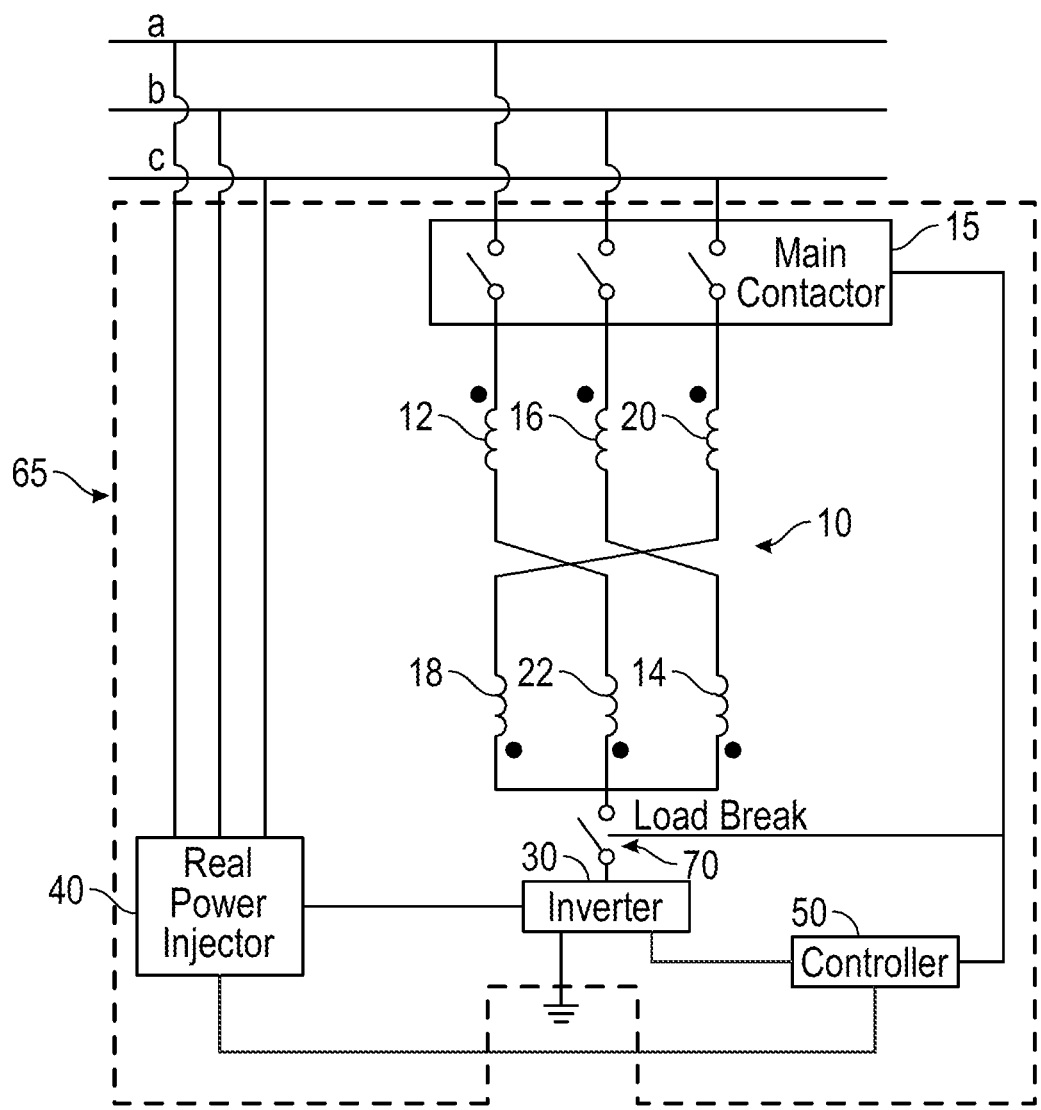
FIG. 3 is a schematic diagram of a zero-sequence current balancer according to a second embodiment of the disclosed concept.

FIG. 3 is a schematic diagram of a zero-sequence current balancer 65 according to a second embodiment of the disclosed concept that is coupled to the phase lines a, b, and c and the neutral conductor (shown as equivalent to the ground connection in this case for ease of illustration) of a three-phase, four wire power system. Zero-sequence current balancer 65 is similar to zero-sequence current balancer 5, and like parts are labelled with like refence numerals. However, in this second embodiment, as described in greater detail below, zero-sequence current balancer 65 differs from zero-sequence current balancer 5 in that it further includes a single-phase load-break switch (normally closed) that interrupts the current flowing into inverter 30 and blocks the applied voltage (by opening the load-break switch). More specifically, as shown in FIG. 3, zero-sequence current balancer 65 includes a four terminal zig-zag transformer 10, a main contactor 15 inserted between zig-zag transformer 10 and phase a, phase b, and phase c of the three-phase, four wire power system, an inverter 30 coupled to the output end of zig-zag transformer 10, a real power injector 40 coupled to inverter 30 and phase a, phase b, and phase c of the three-phase, four wire power system, a load-break switch 70 provided in series between the output end of zig-zag transformer 10 and the input of inverter 30 (to block applied voltage), and a controller 50 structured and configured for controlling operation of the components of zero-sequence current balancer 65. Load-break switch 70 in this embodiment would only need to carry the rated current of inverter 30, not the more extreme fault current, but similar to clamp device 60, may utilize low-cost Thyristor or other semiconductor technology able to block the high voltage present during the grid fault.

Figure 4:
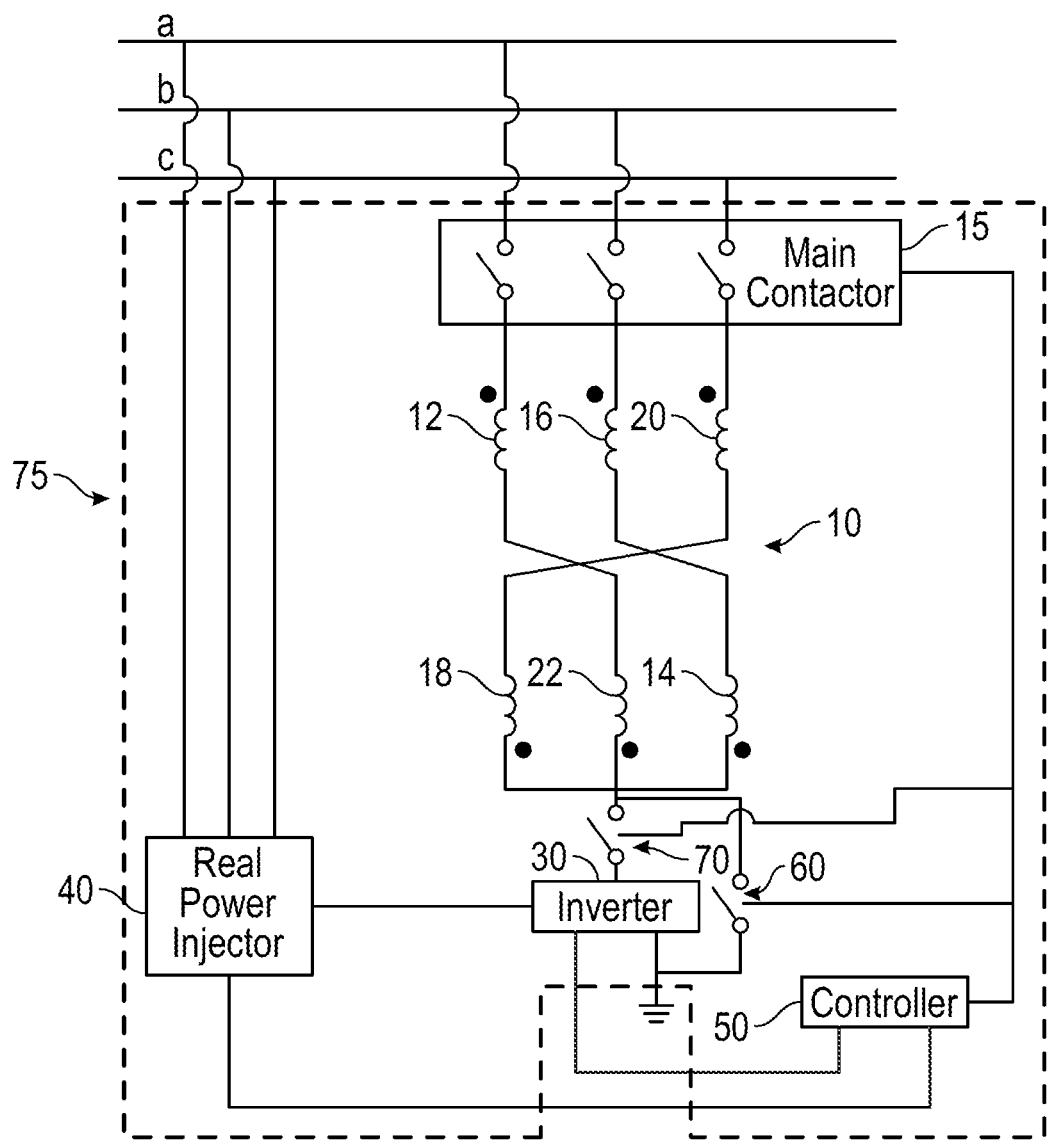
FIG. 4 is a schematic diagram of a zero-sequence current balancer according to a third embodiment of the disclosed concept.

FIG. 4 is a schematic diagram of a zero-sequence current balancer 75 according to a third embodiment of the disclosed concept that is coupled to the phase lines a, b, and c and the neutral conductor (shown as equivalent to the ground connection in this case for ease of illustration) of a three-phase, four wire power system. Zero-sequence current balancer 75 is similar to zero-sequence current balancer 5, and like parts are labelled with like refence numerals. However, in this third embodiment, as described in greater detail below, zero-sequence current balancer 75 differs from zero-sequence current balancer 5 in that it further includes both a high-speed clamp device to bypass inverter 30 as described in connection with FIG. 2, and a load-break switch 70 for blocking voltages to inverter as described in connection with FIG. 3. Either of the two devices, clamp device 60 or load switch 70, can individually protect inverter 30. However, only clamp device 60 would allow zig-zag transformer 10 to contribute to the short-circuit current of the grid, potentially helping the power utility's overall system protection scheme. Carrying both devices allows controller 50 to be programmed to specify the behavior in the event of detected fault, based on the specific system requirements, which may change over time.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A zero-sequence current balancer for a controlling zero-sequence current in a three-phase power system including phase lines and a neutral conductor, comprising:
   a zig-zag transformer having an input end and an output end, the input end being coupled to the phase lines of the three-phase power system;
   an inverter having an input and an output, the output being connected to the neutral conductor;
   a load-break switch operating as a normally closed switch and having a first terminal connected to the output end of the zig-zag transformer and a second terminal connected to the input of the inverter such that the zig-zag transformer, the load-break switch, the inverter and the neutral conductor are connected in series, wherein the load-break switch is structured and configured to carry a rated current of the inverter and to block a voltage present during a grid fault in the three-phase power system;
   a clamp device operating as a normally open switch, the clamp device having a first terminal connected to the output end of the zig-zag transformer and a second terminal connected to the neutral conductor, the clamp device being connected in parallel with the inverter; and
   a controller coupled to the load-break switch, the controller being structured and configured to control operation of the load-break switch and the clamp device, the controller is also being structured and configured to do at least one of: open the load-break switch or close the clamp device based on a detection of a fault condition in the three-phase power system.

2. The zero-sequence current balancer according to claim 1, wherein the load-break switch is a single-phase semiconductor switch.

3. The zero-sequence current balancer according to claim 1, wherein the load-break switch comprises a Thyristor.

4. The zero-sequence current balancer according to claim 1, further comprising a three phase main contractor having a first side directly connected to the phase lines and a second side opposite the first side connected to the input end of the zig-zag transformer.

5. The zero-sequence current balancer according to claim 1, further comprising a real power injector coupled to the phase lines, the inverter and the controller.

6. A method for controlling zero-sequence current in a three-phase power system including phase lines and a neutral conductor, the method comprising:
   providing: (i) a zig-zag transformer having an input end coupled to the phase lines of the three- phase power system and an output end, (ii) an inverter having an input and an output, the output being connected to the neutral conductor, (iii) a load-break switch operating as a normally closed switch and having a first terminal connected to the output end of the zig-zag transformer and a second terminal connected to the input of the inverter such that the zig-zag transformer, the load-break switch, the inverter and the neutral conductor are connected in series, wherein the load-break switch is structured and configured to carry a rated current of the inverter and to block a voltage present during a grid fault in the three-phase power system, (iv) a clamp device operating as a normally open switch, the clamp device having first terminal connected to the output end of the zig-zag transformer and a second terminal connected to the neutral conductor, the clamp device being connected in parallel with the inverter; and (v) a controller structured and configured to control operation of the load-break switch and the clamp device;

detecting in the controller a fault condition in the three-phase power system; and responsive to detecting the fault condition, the controller causing at least one of: opening of the load-break switch or closing of the clamp device.

7. The method according to claim 6, wherein the load-break switch is a single-phase semiconductor switch.

8. The method according to claim 6, wherein the load-break switch comprises a Thyristor.

9. The method according to claim 6, further comprising a three phase main contractor having a first side directly connected to the phase lines and a second side opposite the first side connected to the input end of the zig-zag transformer.

10. The method according to claim 6, the providing further comprising providing a real power injector coupled to the phase lines, the inverter and the controller.

\* \* \* \* \*